(12) United States Patent
Dreyfous

(10) Patent No.: US 6,575,755 B2
(45) Date of Patent: Jun. 10, 2003

(54) FRACTION CIRCLE

(76) Inventor: Ricardo Dreyfous, Urb. Hucares W344 Calle Calderón de la Barca, San Juan, PR (US) 00926

( * ) Notice: Subject to any disclaimer, the term of this patent is extended or adjusted under 35 U.S.C. 154(b) by 0 days.

(21) Appl. No.: 09/738,628

(22) Filed: Dec. 18, 2000

(65) Prior Publication Data

US 2002/0009698 A1 Jan. 24, 2002

Related U.S. Application Data

(60) Provisional application No. 60/196,933, filed on Apr. 13, 2000.

(51) Int. Cl.$^7$ ............................................. G09B 19/02
(52) U.S. Cl. ..................... 434/196; 434/207; 434/208
(58) Field of Search ................. 434/188, 191, 434/196, 207, 208, 211, 214, 81; 273/156, 157 R

(56) References Cited

U.S. PATENT DOCUMENTS

| | | |
|---|---|---|
| 342,651 A | 5/1886 | Southworth |
| 841,158 A | 1/1907 | Koops et al. |
| 2,946,135 A | 7/1960 | Eickmeyer et al. |
| 3,204,344 A | 9/1965 | McMeen |
| 4,096,644 A * | 6/1978 | Nesher et al. ............... 35/31 R |
| 5,470,234 A | 11/1995 | Sher |

FOREIGN PATENT DOCUMENTS

GB               15073         3/1909

* cited by examiner

*Primary Examiner*—Derris H. Banks
*Assistant Examiner*—Kurt Fernstrom
(74) *Attorney, Agent, or Firm*—Nixon & Vanderhye P.C.

(57) ABSTRACT

A mathematical teaching aid includes a plurality of sectional pieces representing fractions of a circle. The pieces are preferably colored corresponding to respective fractions, wherein fraction pieces having a prime number denominator are of primary colors, and other section pieces are of secondary colors. The colors are assigned to the pieces such that primary number denominator sectional pieces of primary colors can be overlaid to form a secondary color, with the sectional piece of that secondary color being representative of a common denominator. The sectional pieces can be combined with a base unit and used for teaching multiplication, division, addition and subtraction of fractions.

13 Claims, 1 Drawing Sheet

FRACTION CIRCLE

This application claims the benefit of U.S. Provisional Patent Application Serial No. 60/196,933, filed Apr. 13, 2000, the entire content of which is herein incorporated by reference.

BACKGROUND OF THE INVENTION

The present invention relates to a teaching apparatus and method and, more particularly, to a teaching apparatus and method using colored sections of a circle to facilitate teaching of mathematical principles with respect to fractions.

A current trend in teaching mathematics is the physical representation of rules and concepts so that students can visualize how the math works without difficult memorization and application of the concept rules. One currently available fraction learning aid is composed of a flat-bottom plate and a single piece pie-shaped guiding segment. The user has to move the guiding piece and manually mark on the fraction scale for each fraction to be worked on. Another device is disclosed in U.S. Pat. No. 5,470,234, wherein a circular holding plate is marked in $1/24^{ths}$ about its periphery, and a number of fraction pieces containing numerous pie-shaped segments are used to depict fractions based on various center angles.

SUMMARY OF THE INVENTION

An important part of teaching fractions is the ability to determine a common denominator, for instance, with respect to addition and subtraction of fractions. Additionally, a student's understanding can be facilitated with the use of colored segments or sections that represent various fractions. To assist in the teaching and understanding of mathematical principles associated with fractions, the sections are placed side-by-side to provide a visual illustration for the student. For example, for addition, two or more of the segments can be placed side-by-side in a base unit holding the segments, illustrating the sum of the fractions represented by the segments, respectively.

According to the present invention, the colored pieces are preferably translucent such that color combinations can be achieved by overlaying one plastic section with another plastic section. Fractions having a denominator that is a prime number are formed of primary colors, and fractions having denominators that are not prime numbers are formed of secondary colors that correspond to the combination of primary colors to thereby illustrate the color of a common denominator. The overlaid colors can also be used to demonstrate fraction multiplication and division.

In accordance with an exemplary embodiment of the invention, a teaching apparatus includes a plurality of colored fraction pieces shaped in varying fractional arc segments of a circle. Colored fraction pieces of fractions having a prime number denominator are formed of primary colors and other colored fraction pieces are formed of secondary colors. The respective primary and secondary colors are assigned to particular fraction pieces such that a denominator of a secondary color fraction piece is a common denominator of primary color fraction pieces where the secondary color of the secondary color fraction piece is a combination of the primary colors of the primary color fraction pieces. The fraction pieces of a prime number denominator to an $n^{th}$ power are preferably formed of the same color to an $n^{th}$ intensity. The colored pieces may be formed of translucent plastic.

In accordance with another exemplary embodiment of the invention, a teaching apparatus includes a plurality of sectional pieces representing fractions of a circle. The sectional pieces are colored such that a sectional piece of a secondary color that results from a color combination of overlaid primary color fractions represents a relationship of the overlaid fractions. The relationship is preferably a common denominator. The teaching apparatus may further include a base unit with a circular opening that is shaped to receive one or more of the colored fraction pieces in a side-by-side relation. The base unit has markings about a periphery of the circular opening corresponding to respective portions of the circular opening circumference. Markings may be spaced in $1/8^{th}$ intervals or $1/12^{th}$ intervals.

In accordance with another exemplary embodiment of the invention, a method of teaching fractions using a plurality of sectional pieces representing fractions of a circle includes the steps of providing the sectional pieces in varying colors respectively corresponding to particular fractions, and overlaying sectional pieces of primary colors such that the resulting secondary color represents a relationship of the fractions represented by the overlaid pieces.

BRIEF DESCRIPTION OF THE DRAWINGS

These and other features and advantages of the present invention will be described in detail with reference to the accompanying drawings, in which.

DETAILED DESCRIPTION OF PREFERRED EMBODIMENTS

Figure 1:
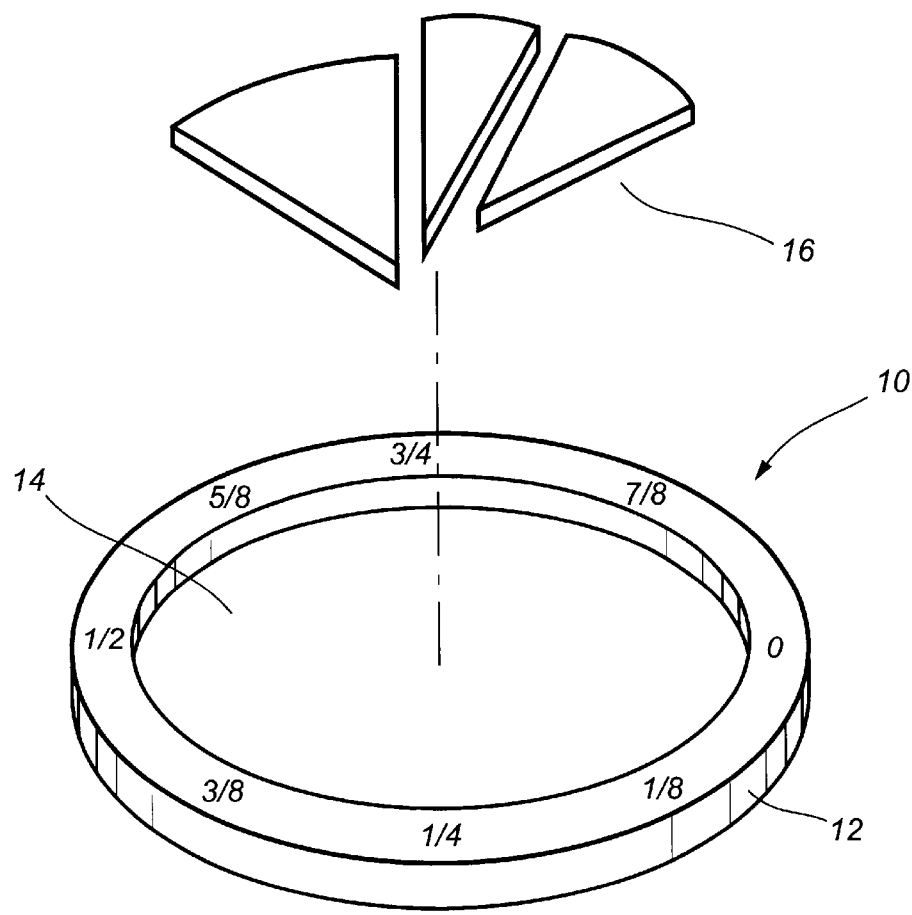
FIG. 1 is a perspective view of the fraction circle teaching aid according to the present invention.

Referring to FIG. 1, the teaching apparatus 10 according to the invention includes a base member 12, which can be circular or square or any other appropriate shape, including a circular opening 14. The base member 12 includes markings corresponding to the portion of the circle about the circumference of the opening 14. Exemplary markings shown in FIG. 1 are divided into $1/8^{ths}$, but a more preferable division of the circle is by $1/12^{ths}$ or smaller.

The apparatus also includes a plurality of plastic section pieces 16 defining partial arc segments of a circle. In a preferred embodiment, each segment representing $1/12^{th}$ of a circle is represented, and three to ten pieces of each segment are included with the apparatus. That is, there is a plastic piece 16 for each $1/12^{th}$ of a circle from a piece size of $1/12^{th}$ through a full circle piece size. Of course, greater or fewer numbers of pieces and/or fractions can be included with the apparatus, and the invention is not meant to be limited to any particular combination of materials.

The pieces are preferably formed of a translucent plastic material of specific colors. Generally, fractions having prime number denominators such as 2, 3 and 5 are formed of primary colors such as blue, yellow and red. Fractions having powers of the primary number denominators are similarly colored to an $n^{th}$ intensity. For example, if the $1/2$ section piece is blue, the section piece for $1/4$ (where the denominator is $2^2$) is blue with a higher intensity (i.e., blue over blue). Similarly, if the fraction piece representing $1/3$ is yellow, the fraction piece for $1/9$ (where the denominator is $3^2$) is yellow with a higher intensity. The remaining numbers, representing combinations of the primary number common denominators are formed using secondary colors such as green and purple. These colors represent the combination of the primary colors. For example, if the section piece for ½ is blue and the section piece for ⅓ is yellow, the section piece for ⅙ is green. Similarly, if the section piece for ½ is blue and the section piece for ⅕ is red, the section piece for ⅒ is purple.

Figure 2:
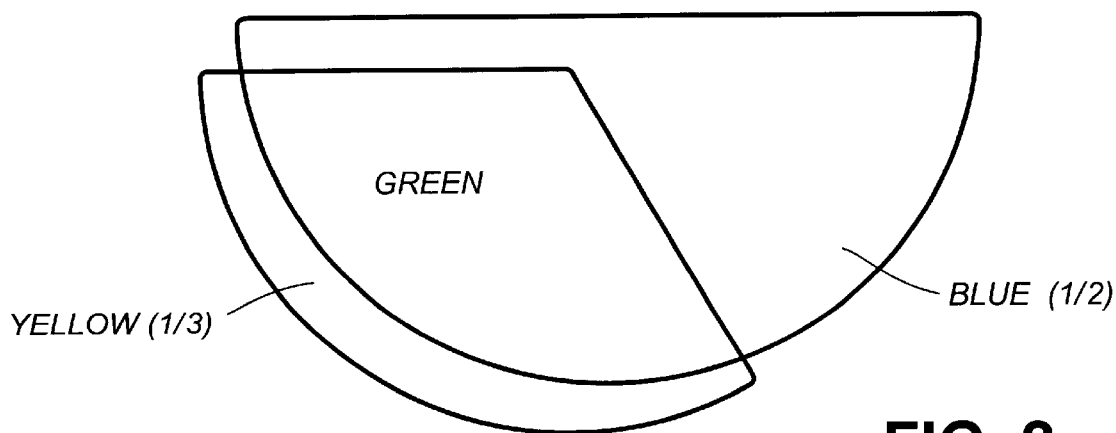
FIG. 2 illustrates an exemplary mathematical expression to help a student to learn mathematical principles of fractions.

In the first example, referring to FIG. 2, to illustrate the concept of common denominator or as used in a multiplication example, the yellow ⅓ piece is overlaid with the blue ½ piece, and the overlap area is green. The student can then be shown the green piece representing ⅙, which is a result of the multiplication of these fractions and/or is indicative of a common denominator for addition or subtraction. The ⅙ pieces can then be placed on the ⅓ section, and the student can see that two of the ⅙ pieces fit onto the ⅓ piece. Since the problem is multiplying by ½, the student selects one of the two ⅙ pieces, thereby illustrating the result of the problem.

To illustrate the addition of fractions, a student can place the pieces 16 representing the fractions to be added within the circle 14 of the base unit 12, starting at the zero position. The sum of the fractions is the resulting segment when the pieces are placed end-to-end in the circle. In an alternative methodology, without using the base unit 12, addition of fractions can be illustrated using the translucent fraction pieces 16. Using the same example to add ½+⅓, the ½ fraction piece (e.g., blue) is overlaid on the ⅓ fraction piece (e.g., yellow), resulting in the secondary color green. The fraction piece that is green is the ⅙ fraction piece. The student can determine how many ⅙ pieces are equivalent to or completely cover the ½ section piece, and the ½ section piece is replaced by three of the ⅙ section pieces. Using the same procedure for the ⅓ section piece, two of the ⅙ section pieces replace the ⅓ section piece. Then, ½+⅓=3/6+2/6=5/6. Subtraction can be illustrated using the circle 14 in the base unit 12 by overlaying a smaller of the two fractions on top of a larger of the two fractions, with the non-overlapped space representing the difference between the two fractions. Overlaying of the fraction pieces similar to the addition methodology discussed above can also be used for illustrating subtraction. Of course, three or more fractions could be added or subtracted using the same methodology.

A methodology for illustrating division of fractions using the base unit 12 and pieces 16 according to the invention is performed by a procedure opposite to that described above with respect to multiplication. Using the same example, to divide fractions by whole numbers, i.e., ½ divided by 3, the ½ piece needs to be divided into three equal parts, so the student can overlay the ½ piece with the ⅓ piece to show green. The ⅙ piece is colored green, and three of the ⅙ pieces are placed over the ½ piece. Dividing fractions by fractions can be shown using principles noted above with respect to addition and/or multiplication accordingly.

The invention may also be embodied in a computer implementation, wherein a computer system is programmed to carry out the method according to the invention, using graphical representations of the base member 12 and section pieces 16.

Using the teaching apparatus according to the present invention, mathematical principles for fractions can be visually demonstrated to facilitate the teaching and learning of fractions. Moreover, the base unit and pieces provide a tangible link for teaching fraction principles that the students can handle and manipulate, thereby making learning about fractions more fun.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A teaching apparatus comprising a plurality of colored fraction pieces shaped in varying fractional arc segments of a circle,
    wherein colored fraction pieces of fractions having a prime number denominator are formed of primary colors and other colored fraction pieces are formed of secondary colors,
    the respective primary and secondary colors being assigned to particular fraction pieces such that a denominator of a secondary color fraction piece is a common denominator of primary color fraction pieces where the secondary color of the secondary color fraction piece is a combination of the primary colors of the primary color fraction pieces.

2. A teaching apparatus according to claim 1, wherein fraction pieces of a prime number denominator to an $n^{th}$ power are formed of the same color.

3. A teaching apparatus according to claim 1, wherein fraction pieces of a prime number denominator to an $n^{th}$ power are formed of the same color with a higher intensity.

4. A teaching apparatus according to claim 1, wherein the colored pieces are formed of translucent plastic.

5. A teaching apparatus comprising a plurality of sectional pieces shaped in varying fractional arc segments of a circle, wherein the sectional pieces of fractions having a prime number denominator are formed of primary colors and other sectional pieces are formed of secondary colors and represent products of the prime number denominators.

6. A teaching apparatus according to claim 5, wherein sectional pieces with a prime number denominator to an nth power are formed of the same color.

7. A teaching apparatus according to claim 5, wherein fraction pieces of a prime number denominator to an nth power are formed of the same color with a higher intensity.

8. A teaching apparatus according to claim 5, wherein the sectional pieces are formed of translucent plastic.

9. A teaching apparatus according to claim 5, further comprising a base unit with a circular opening that is shaped to receive one or more of the sectional pieces in a side-by-side relation, the base unit including markings about a periphery of the circular opening corresponding to respective portions of the circular opening circumference.

10. A teaching apparatus according to claim 9, wherein the markings are spaced in $⅛^{th}$ intervals.

11. A teaching apparatus according to claim 9, wherein the markings are spaced in $1/12^{th}$ intervals.

12. A method of teaching fractions using a plurality of sectional pieces shaped in varying fractional arc segments of a circle, the method comprising providing the sectional pieces of fractions having a prime number denominator in primary colors and other sectional pieces in secondary colors, the respective primary and secondary colors being assigned to particular sectional pieces, and overlaying sectional pieces of primary colors such that the resulting secondary color represents a product of the prime number denominators.

13. A method according to claim 12, wherein the providing step comprises providing the sectional pieces formed of translucent plastic.

\* \* \* \* \*